United States Patent [19]

Shibata

[11] Patent Number: 4,959,342

[45] Date of Patent: Sep. 25, 1990

[54] METHOD OF PRODUCING CATALYST CARRIERS

[76] Inventor: Motonobu Shibata, 18-86, Andon, Nakanosho-Cho, Inazawa City, Aichi Pref., Japan

[21] Appl. No.: 288,232

[22] Filed: Dec. 22, 1988

[30] Foreign Application Priority Data

Jun. 27, 1988 [JP] Japan ................... 63-156831

[51] Int. Cl.$^5$ ............................................. B01J 32/00
[52] U.S. Cl. .................................... 502/439; 502/527
[58] Field of Search ................ 502/439, 527; 428/653

[56] References Cited

U.S. PATENT DOCUMENTS

| | | | |
|---|---|---|---|
| 4,252,690 | 2/1981 | Kamiya et al. | 502/527 X |
| 4,601,999 | 7/1986 | Retallick et al. | 502/439 X |
| 4,752,599 | 6/1988 | Nakamura et al. | 502/439 X |
| 4,797,329 | 1/1989 | Kilbane et al. | 502/527 X |

FOREIGN PATENT DOCUMENTS 0243702  4/1987  European Pat. Off. .
56-96726 8/1981  Japan .
2005149A 4/1979  United Kingdom .

*Primary Examiner*—W. J. Shine
*Attorney, Agent, or Firm*—Arnold, White & Durkee

[57] ABSTRACT

A catalyst carrier is disclosed, which comprises a substrate made of a stainless steel at least containing no aluminum, and an alumina thin layer formed on surfaces of the substrate through an aluminum-iron compond layer. The catalyst carrier is shaped as a porous body having gas permeability in at least one direction. A process for producing such a catalyst carrier is also disclosed, which comprises the steps of: (i) preparing a metal strip from a stainless steel at least containing no aluminum; (ii) plating surfaces of the metal strip with aluminum; (iii) rolling the aluminum-plated metal strip; (iv) converting the rolled metal strip to a corrugated porous body having gas permeability in at least one direction; and (v) forming an alumina thin film by oxidizing the plated aluminum layer through heat treating the porous body at 600° to 1,000° C. for not less than 10 minutes.

4 Claims, 2 Drawing Sheets

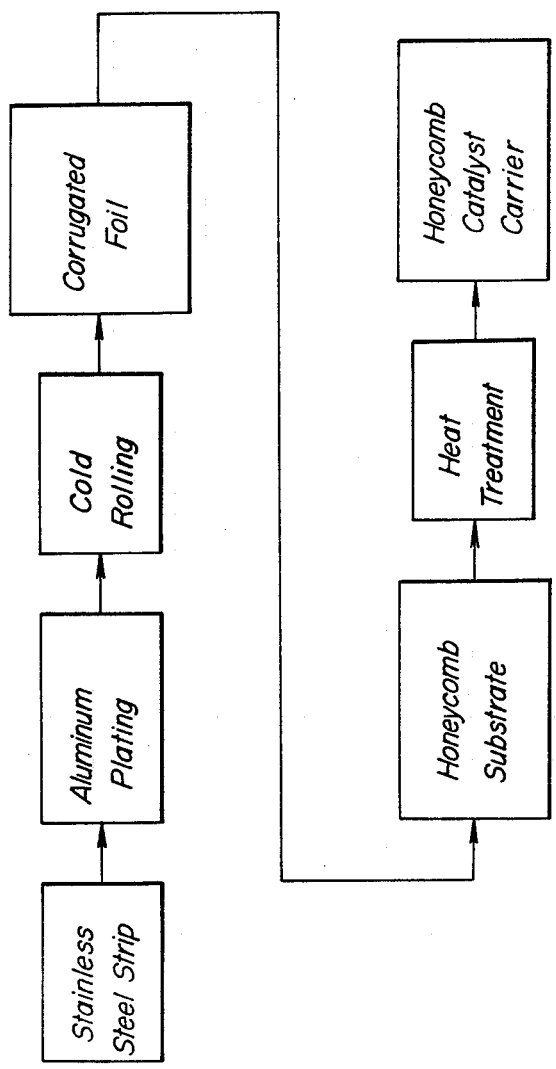

METHOD OF PRODUCING CATALYST CARRIERS

BACKGROUND OF THE INVENTION (1) Field of the Invention:

The present invention relates to catalyst carriers made of a metallic material (hereinafter referred to as "metallic catalyst carriers") to be used for purification catalysts to purify combustion waste gases exhausted from automobiles, factories, etc. The invention also relates to a process for producing such catalyst carriers.

(2) Related Art Statement:

Heretofore, Japanese Pat. Application Laid-open No. 56-96,726 discloses a technique using, as a metallic catalyst carrier, a foil made of an aluminum-containing ferrite type stainless steel in which alumina whiskers are formed on surfaces of the foil through heat treatment. According to this technique, a stainless steel which can withstand high temperatures is used, and the alumina whiskers are present on its surface. Therefore, when a catalyst such as $\gamma$-$Ae_2O_3$ is carried on such a catalyst carrier as a wash coat, the alumina whiskers function as wedges. Thus, the wash coat made of the catalyst such as $\gamma$-$Ae_2O_3$ can firmly be bonded to the metallic catalyst carrier.

However, in the catalyst carrier disclosed in Japanese Pat. Application Laid-open No. 56-96,726, since the ferrite type stainless steel as a substrate contains aluminum, its plastic deformability is much lower. Thus, it takes many steps to obtain a foil of the stainless steel of this kind, which makes mass production difficult.

SUMMARY OF THE INVENTION

It is an object of the present invention to diminish the above-mentioned problems, and to provide catalyst carriers in which an alumina thin layer can firmly be bonded to a substrate and which is free from reduction in plastic deformability.

It is a further object of the present invention to provide a process for producing such catalyst carriers.

According to the catalyst carrier of the present invention, an alumina thin layer is formed on the aluminum-iron compound layer produced on the surfaces of a substrate made of a stainless steel at least containing substantially no aluminum, and the catalyst carrier is shaped in the form of a porous body having gas permeability in at least one direction.

According to the producing process of the present invention, a metal strip is prepared from a stainless steel at least containing no aluminum, and aluminum is plated onto surfaces of the metal strip. Then, the plated metal strip is cold rolled, and a corrugated porous body having gas permeability in at least one direction is made from the rolled metal strip. Thereafter, the corrugated porous body is thermally treated at 600° to 1,000° C. for not less than 10 minutes so that the plated aluminum is oxidized to form an alumina thin layer.

In the above construction, no Ae is contained in the substrate to produce alumina whiskers. Instead, the surfaces of the substrate are plated with aluminum, and the alumina thin layer which has substantially the same performances as those of the alumina whiskers is formed by heat treating the plated aluminum layer under the specific conditions. Therefore, mass productivity can be improved without damaging the plastic deformability.

In addition, in the case that plating is effected with aluminum as in the present invention, a pretreatment such as coarsening of the surfaces to be plated is unnecessary which differ from the case in which the alumina is directly coated on the substrate. Accordingly, producing steps can be simplified. Although an aluminum iron compound is formed between the plated aluminum layer and the substrate made of the stainless steel, since the aluminum diffuses into the substrate, such a compound does not influence bondability between the plated aluminum layer and the substrate when its thickness is not more than 40 $\mu$m.

If the heating temperature is less than 600° C., it takes a long time to form the alloy and a sufficient alumina thin layer is not formed. Thus, heating temperature below 600° C. is unpractical. On the other hand, if the heating temperature is more than 1,000° C., the alloy layer peels due to rapid alloying. If the heating time is less than 10 minutes, the formation of the alumina layer or the alloying are not sufficiently effected. Therefore, the heating conditions are limited to the heating temperature: 600° to 1,000° C. and the heating time: not less than 10 minutes.

These and other objects, features, and advantages of the invention will be appreciated upon reading the following description of the invention when taken in conjunction with the attached drawings, with the understanding that some modifications, variations and changes of the same could be made by one skilled in the art to which the invention pertains without departing from the spirit of the invention or the scope of claims appended hereto.

BRIEF DESCRIPTION OF THE DRAWINGS

For a better understanding of the invention, reference is made to the attached drawings, wherein:

FIG. 1 is a flow chart explaining an example of the process for producing the catalyst carriers according to the present invention.

DETAILED DESCRIPTION OF THE INVENTION

Figure 2A:
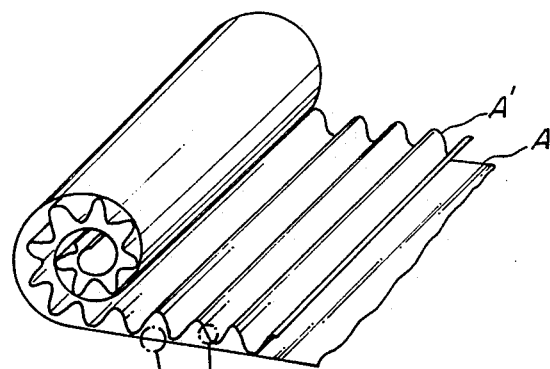
FIGS. 2a and 2b are a perspective view and an enlarged view, respectively, of part of an embodiment of the catalyst carrier according to the present invention.

The present invention will be explained in more detail below.

As will be mentioned later in connection with specific examples, if the thickness of the plated aluminum layer exceeds 10 $\mu$m, the aluminum-iron compound layer most likely will peel off due to influences in the difference of thermal expansion. On the other hand, it is very difficult to control the thickness of the plated aluminum layer when the thickness is less than 1 $\mu$m. Therefore, the thickness of the plated aluminum layer is preferably in a range from 1 to 10 $\mu$m.

Next, preferred embodiments of the respective constituent features of the present invention will be explained in more detail.

(1) Substrate:

(a) As the shape of the substrate, those given in Table 1 are preferably used.

TABLE 1

| Shape | | Use state of substrate |
|---|---|---|
| Strip | Thickness: | 0.03 to 0.50 mm |
| | Surface | flat, embossed, finely corru- |

TABLE 1-continued

| Shape | Use state of substrate |
|---|---|
| | conditions: gated, perforated, or the like |

(b) Composition range of the stainless steel (Units are all "% by weight"):

It is necessary that the stainless steel is composed of indispensable ingredients and additive elements given in the following Table 2.

TABLE 2

| Indispensable ingredients | | Elements allowed to be added (one or more kinds of additives) | | | |
|---|---|---|---|---|---|
| Cr: | 10~26 | Ni: | 0~30 | Si: | 0~5 |
| Fe: | remainder other than the above | Cu: | 0~3 | Mn: | 0~10 |
| | | Be: | 0~3 | Mo: | 0~6 |
| | | Zr: | 0~1 | V: | 0~5 |
| | | Y: | 0~3 | Co: | 0~5 |
| | | Ce: | 0~3 | | |

Among the stainless steels, the following ones in Table 3 are recited as preferred.

TABLE 3

| SUS304 type | | | |
|---|---|---|---|
| Cr: | 18~20 | Si: | not more than 1.00 |
| Mn: | not more than 2.00 | Ni: | 9.0~13.0 |
| Fe: | remainder | | |
| SUS316 type | | | |
| Cr: | 16~18 | Si: | not more than 1.00 |
| Mn: | not more than 2.00 | Ni: | 12.0~15.0 |
| Mo: | 2.0~3.0 | Fe: | remainder |
| SUS321 type | | | |
| Cr: | 17~19 | Si: | not more than 1.00 |
| Mn: | not more than 2.00 | Ni: | 9.00~13.0 |
| Fe: | remainder | | |
| SUS410 type | | | |
| Cr: | 11.0~13.5 | Si: | not more than 1.00 |
| Mn: | not more than 1.00 | Fe: | remainder |
| Other type | | | |
| Cr: | 13~18 | Fe: | remainder |

(2) Shape of the porous body:

As given in the following Table 4, preferred shapes of the substrates are present.

TABLE 4

| Substrate | Shape of porous body |
|---|---|
| Strip | A porous body is shaped by corrugating a thin strip of 0.03 to 0.50 mm in thickness to form numerous through holes in an axial direction. |
| | A porous body is shaped by preliminarily embossing, perforating, or finely corrugating a thin strip of 0.03 to 0.50 mm in thickness; further corrugating and shaping it to form numerous through holes in an axial direction. |

(3) Plated aluminum layer:

The plated aluminum layer is composed of not less than 80% by weight of aluminum as a main ingredient and, as is clear from the examples mentioned later, its thickness is preferably in a range from 1 to 10 μm.

The plated aluminum layer may be formed by a known process such as a hot dipping in a molten aluminum bath.

Next, the process for producing the catalyst carriers according to the present invention will be roughly explained with reference to a flow chart of FIG. 1 by way of example. In this flow chart of FIG. 1, a corrugated honeycomb catalyst carrier is produced from a metal strip. First, the metal strip having a given composition as recited above is produced from a stainless steel containing no aluminum. A conventionally known process such as rolling may be used for producing the strip. Next, the surfaces of the strip are plated with aluminum in a given thickness. Then, the plated strip is rolled to obtain a metal foil. The metal foil is corrugated. The thus corrugated metal foils and the non-corrugated metal foils are alternatively piled one upon another, or laminated and then coiled to obtain a honeycomb substrate. The thus obtained honeycomb substrate is heat treated under given conditions, so that the plated aluminum layer is oxidized to give an alumina thin film and that an aluminum-iron compound layer is formed at the same time. Thereby, a catalyst carrier having gas permeability in at least one direction is obtained.

Figure 2B:
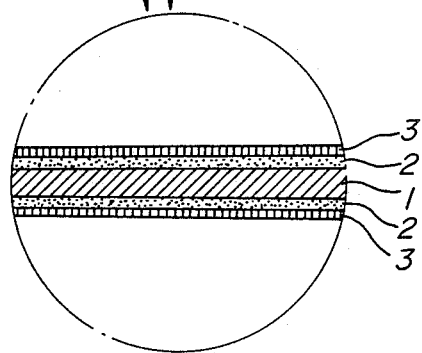

FIGS. 2a and 2b are a perspective view and an enlarged view of a part of the catalyst carrier according to the present invention in an uncoiled state. This catalyst carrier is obtained by placing a corrugated foil A' on a non-corrugated flat metal foil A, and coiling them together. In FIG. 2b, reference numerals 1, 2 and 3 are a stainless steel, an aluminum-iron compound layer, and an alumina thin film, respectively.

In the following, actual examples of the catalyst carriers will be explained.

In order to produce a metal strip as a substrate, a stainless steel having a specific composition was melted in a vacuum melting furnace to obtain an ingot. The obtained ingot was repeatedly subjected to cold rolling and annealing after hot rolling, thereby obtaining a metal plate having a thickness of about 1 mm. The metal plate was cut to 100×500 mm as a substrate to be plated by hot dipping of molten aluminum.

The substrate was coated with alumina in the following procedure. First, in order to conduct hot dipping a molten aluminum bath containing aluminum alloy of 8% by weight of Si was prepared. Next, the metal substrate was cleaned with a mixed acid solution containing 10 wt% of nitric acid and 2 wt% of hydrofluoric acid for about 10 minutes as a pretreatment. After the thus treated metal substrate was immersed into the molten aluminum bath prepared above, an amount of aluminum attached was adjusted by gas wiping. The thickness of the plated aluminum was further adjusted by rolling the hot-dipped substrate, and the substrate was cut into a test substrate of 100 mm square. The thickness of the plated aluminum was adjusted to 5 μm in each example.

Thereafter, the metal substrate having the plated aluminum layer was heat treated. The heat treatment was carried out by heating the metal substrates at a temperature ranging from 500° to 1,100° C. for various time periods in air as shown in Table 5.

In order to evaluate the characteristics, a section of each of test samples thus obtained was observed with a microscope. Results are shown in Table 5.

TABLE 5

| No. | Heat treating temperature | Treating time | Formation of alloy layer | Alumina-formed film | Use composition (wt %) |
|---|---|---|---|---|---|
| 1 | 500° C. | 1 hr. | Almost not alloyed | — | Cr 19.0 |
| 2 | 550° C. | 1 hr. | Almost not alloyed | — | Ni 10.0 |
| 3 | 550° C. | 500 hr. | Al layer partially remained | 0.2 μm | Si 0.30 |
| 4 | 600° C. | 5 min. | Al layer partially remained | 0.5 μm | Mn 0.50 |
| 5 | 600° C. | 10 min. | Entirely alloyed | 0.8 μm | Fe remainder |
| 6 | 600° C. | 1 hr. | Entirely alloyed | 1.5 μm | |
| 7 | 800° C. | 1 hr. | Entirely alloyed | 2.0 μm | |
| 8 | 1,000° C. | 500 hr. | Entirely alloyed | 3.0 μm | |
| 9 | 1,100° C. | 1 hr. | Part of alloy layer peeled | 4.0 μm | |
| 10 | 1,100° C. | 500 hr. | Part of alloy layer peeled | — | |

It is seen that the heat treating conditions must be 600° to 1,000° C. for not less than 10 minutes.

With respect to the stainless steel substrate meeting the composition range according to the present invention among the above-mentioned examples, test pieces were prepared by heat treatment at 900° C. for 10 minutes in air, while the thickness of the plated aluminum layer was varied. In order to evaluate their characteristics, the thus obtained test pieces were subjected to a thermal shock test through heating-cooling cycles by using a device for automatically placing them into an electric furnace at 900° C. in air and extracting them therefrom. The test was repeated for 500 cycles between 900° C. for 15 minutes and room temperature for 45 minutes. The surface state of each of the test pieces was observed with the naked eye. Results are shown in Table 6.

TABLE 6

| No. | Thickness of plated aluminum layer (μm) | Composition (wt %) | | Surface state after thermal shock test |
|---|---|---|---|---|
| 1 | 1.0 | | | no abnormality |
| 2 | 2.5 | Cr: | 19.0 | no abnormality |
| 3 | 5.0 | Ni: | 10.0 | no abnormality |
| 4 | 8.0 | Si: | 0.3 | no abnormality |
| 5 | 10.0 | Mn: | 0.5 | no abnormality |
| 6 | 15.0 | Fe: | remainder | partially peeled |
| 7 | 20.0 | | | partially peeled |

From Table 6, it is clear that the thickness of the plated aluminum layer is preferably not more than 10 μm.

As is evident from the foregoing explanation, according to the catalyst carriers and the producing process therefor in the present invention, no aluminum is added into the substrate to produce alumina whiskers. Instead, the surfaces of the substrate are plated with aluminum, and the plated aluminum layer is oxidized by heat treatment to form the alumina thin film. Thus, the catalyst carries which have gas permeability in at least one given direction useful for the purification of various kinds of waste gases, can be obtained by simpler producing steps without damaging the plastic deformability.

What is claimed is:

1. A method of producing a catalyst carrier, consisting essentially of the following steps:
   preparing a metal strip from a stainless steel containing no aluminum;
   plating surfaces of said metal strip with aluminum to a thickness of 1–10 μm;
   rolling said aluminum-plated metal strip;
   corrugating said rolled metal strip to form a porous body having gas permeability in at least one direction; and
   simultaneously forming an aluminum-iron alloy layer, by reacting said plated aluminum with said stainless steel, and an alumina film on said rolled metal strip by oxidizing said plated aluminum through heat treating said porous body at 600° to 1000° C. in air for not less than 10 minutes.

2. The method of claim 1, wherein the porous body is formed by corrugating said rolled metal strip in at least one direction and then coiling said corrugated strip.

3. The method of claim 1, wherein the porous body is formed by corrugating said rolled metal strip, laminating the corrugated metal strip onto a non-corrugated rolled strip and coiling the laminate.

4. The method of claim 1, wherein a thickness of said aluminum-iron alloy layer is not more than 40 μm.

* * * * *